United States Patent
Lee (10) Patent No.: US 11,122,214 B2
(45) Date of Patent: Sep. 14, 2021

(54) IMAGE CAPTURE DEVICE (71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 16/045,753

(22) Filed: Jul. 26, 2018

(65) Prior Publication Data

US 2018/0338077 A1 Nov. 22, 2018

Related U.S. Application Data (63) Continuation of application No. 15/353,743, filed on Nov. 17, 2016, now Pat. No. 10,097,767.

(30) Foreign Application Priority Data

Mar. 21, 2016 (TW) .................................. 105108616

(51) Int. Cl.
| | |
|---|---|
| *H04N 5/235* | (2006.01) |
| *G01S 17/08* | (2006.01) |
| *H04N 5/225* | (2006.01) |
| *H04N 13/254* | (2018.01) |
| *G01J 1/32* | (2006.01) |
| *G01J 1/42* | (2006.01) |

(52) U.S. Cl.
CPC .............. *H04N 5/2354* (2013.01); *G01J 1/32* (2013.01); *G01J 1/42* (2013.01); *G01J 1/4228* (2013.01); *G01S 17/08* (2013.01); *H04N 5/2256* (2013.01); *H04N 13/254* (2018.05)

(58) Field of Classification Search
CPC ...... H04N 5/2256; H04N 5/2354; G03B 7/16; G03B 7/17; G03B 15/02–05; G03B 2215/05; G03B 2215/0596; G02B 15/02–05

See application file for complete search history.

(56) References Cited

U.S. PATENT DOCUMENTS

| | | | |
|---|---|---|---|
| 6,421,506 B1 * | 7/2002 | Maruyama ............. | G03B 17/02 348/333.01 |
| 9,609,230 B1 * | 3/2017 | Bakshi ................. | H04N 5/2354 |
| 2001/0019364 A1 | 9/2001 | Kawahara | |
| 2004/0135923 A1 * | 7/2004 | Kato .................... | H04N 5/2354 348/371 |
| 2007/0166023 A1 | 7/2007 | Murata | |

(Continued)

FOREIGN PATENT DOCUMENTS

| | | |
|---|---|---|
| CN | 101889435 A | 11/2010 |
| CN | 103369394 A | 10/2013 |

(Continued)

*Primary Examiner* — Paul M Berardesca
(74) *Attorney, Agent, or Firm* — Winston Hsu (57) ABSTRACT

An image capture device includes a light source, an image capture circuit, and a processor. The light source is used for generating emitting light. The image capture circuit is used for capturing an image corresponding to the emitting light. The processor is coupled to the light source and the image capture circuit for optionally adjusting the intensity of the emitting light of the light source according to luminance corresponding to the image and a target value.

4 Claims, 10 Drawing Sheets

(56) References Cited

U.S. PATENT DOCUMENTS

| | | | |
|---|---|---|---|
| 2009/0167738 A1* | 7/2009 | Gotanda | H04N 5/23212 |
| | | | 345/207 |
| 2010/0026853 A1* | 2/2010 | Mokhnatyuk | H04N 5/23296 |
| | | | 348/240.2 |
| 2012/0108291 A1* | 5/2012 | Sumisaki | G03B 7/099 |
| | | | 455/556.1 |
| 2013/0016249 A1 | 1/2013 | Mine | |
| 2013/0039539 A1* | 2/2013 | Brandl | G01V 8/12 |
| | | | 382/103 |
| 2013/0141544 A1* | 6/2013 | Tsuyuki | H04N 13/254 |
| | | | 348/47 |
| 2016/0112621 A1* | 4/2016 | Nishi | H04N 17/002 |
| | | | 348/234 |
| 2016/0127630 A1 | 5/2016 | Kitajima | |
| 2016/0164261 A1* | 6/2016 | Warren | H01S 5/18388 |
| | | | 348/164 |
| 2016/0165154 A1 | 6/2016 | Shinomiya | |

FOREIGN PATENT DOCUMENTS

| | | |
|---|---|---|
| CN | 103905711 A | 7/2014 |
| TW | 200900830 | 1/2009 |
| TW | 201112754 A1 | 4/2011 |

* cited by examiner

IMAGE CAPTURE DEVICE

CROSS REFERENCE TO RELATED APPLICATIONS

This is a continuation application of U.S. patent application Ser. No. 15/353,743, filed on Nov. 17, 2016, and all benefits of such earlier application are hereby claimed for this new continuation application.

BACKGROUND OF THE INVENTION

1. Field of the Invention

The present invention relates to an image capture device and an operation method thereof, and particularly to an image capture device and an operation method thereof that can ensure that a light source of the image capture device does not damage eyes of a user within a maximum operation distance of emitting light generated by the light source.

2. Description of the Prior Art

Although structure light can increase quality of a depth map, the structure light is usually emitted by stronger power to increase an operation distance of the structure light, wherein the prior art specifies that luminance of the structure light corresponding to a maximum operation distance of the structure light cannot damage eyes of a user. Although the luminance of the structure light corresponding to the maximum operation distance does not damage the eyes of the user, the eyes of the user may still be damaged within the maximum operation distance under the same power which makes the luminance of the structure light corresponding to the maximum operation distance not damage the eyes of the user. Because an interactive audio and video device which can interact with the user becomes gradually popular, how to make the eyes of the user not be damaged within a maximum operation distance of the interactive audio and video device becomes an important issue.

SUMMARY OF THE INVENTION

An embodiment of the present invention provides an image capture device. The image capture device includes a light source, an image capture circuit, and a processor. The light source is used for generating emitting light. The image capture circuit is used for capturing an image corresponding to the emitting light. The processor is coupled to the image capture circuit and the light source for optionally adjusting intensity of the emitting light of the light source according to luminance corresponding to the image and a target value.

The present invention provides an image capture device. The image capture device utilize a processor optionally adjust intensity of emitting light of a light source of the image capture device according to different luminance values of an image corresponding to the emitting light of the light source and a target value. Therefore, compared to the prior art, the present invention can ensure that the light source of the image capture device does not damage eyes of a user within a maximum operation distance of the emitting light generated by the light source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
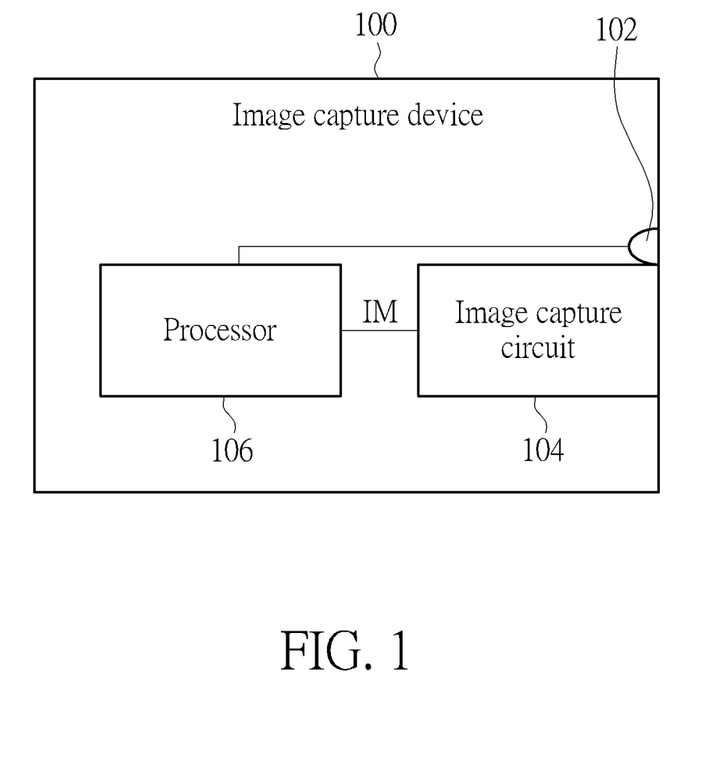
FIG. 1 is a diagram illustrating an image capture device according to a first embodiment of the present invention.
Figure 2:
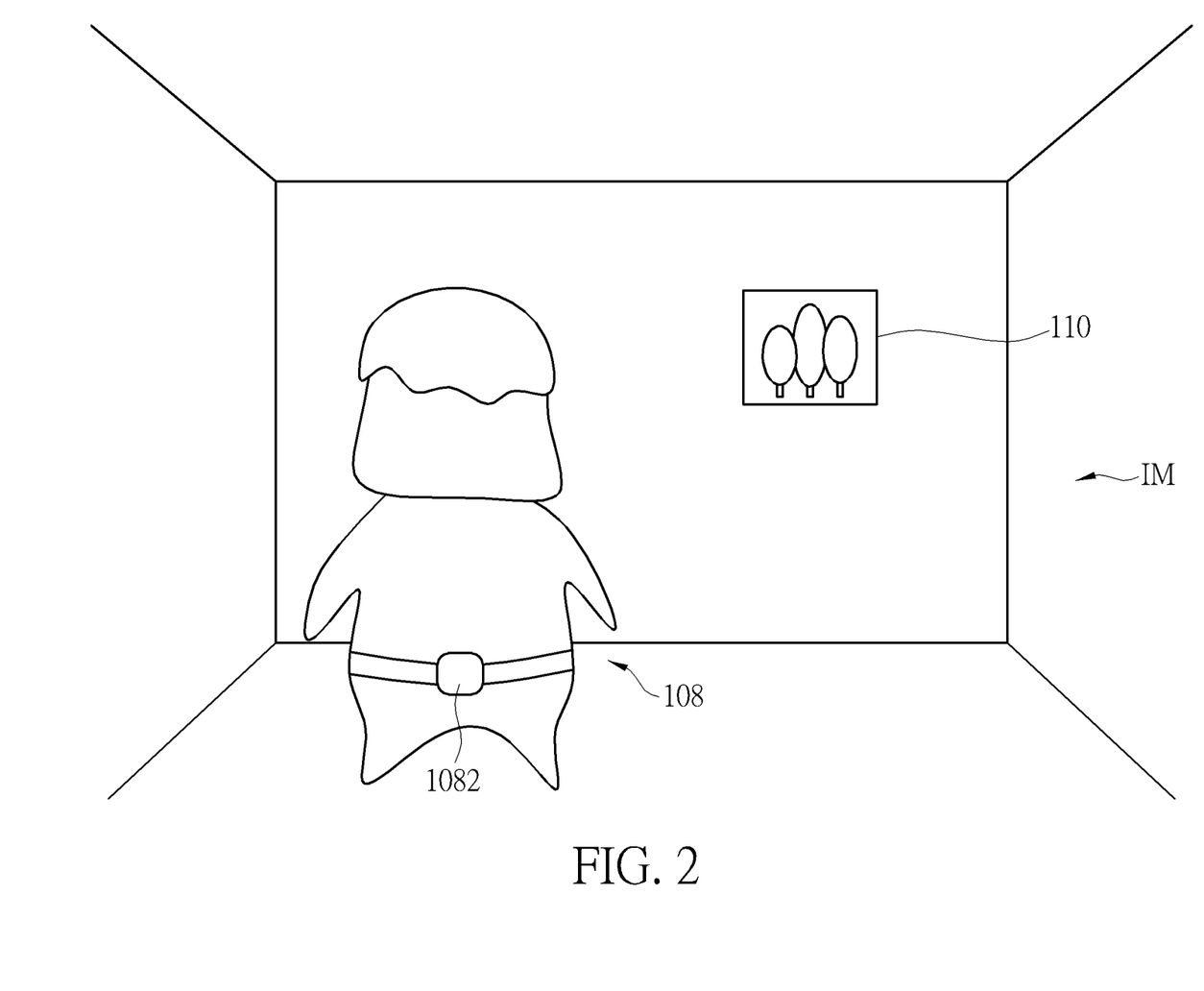
FIG. 2 is a diagram illustrating an image corresponding to the emitting light of the light source.
Figure 3:
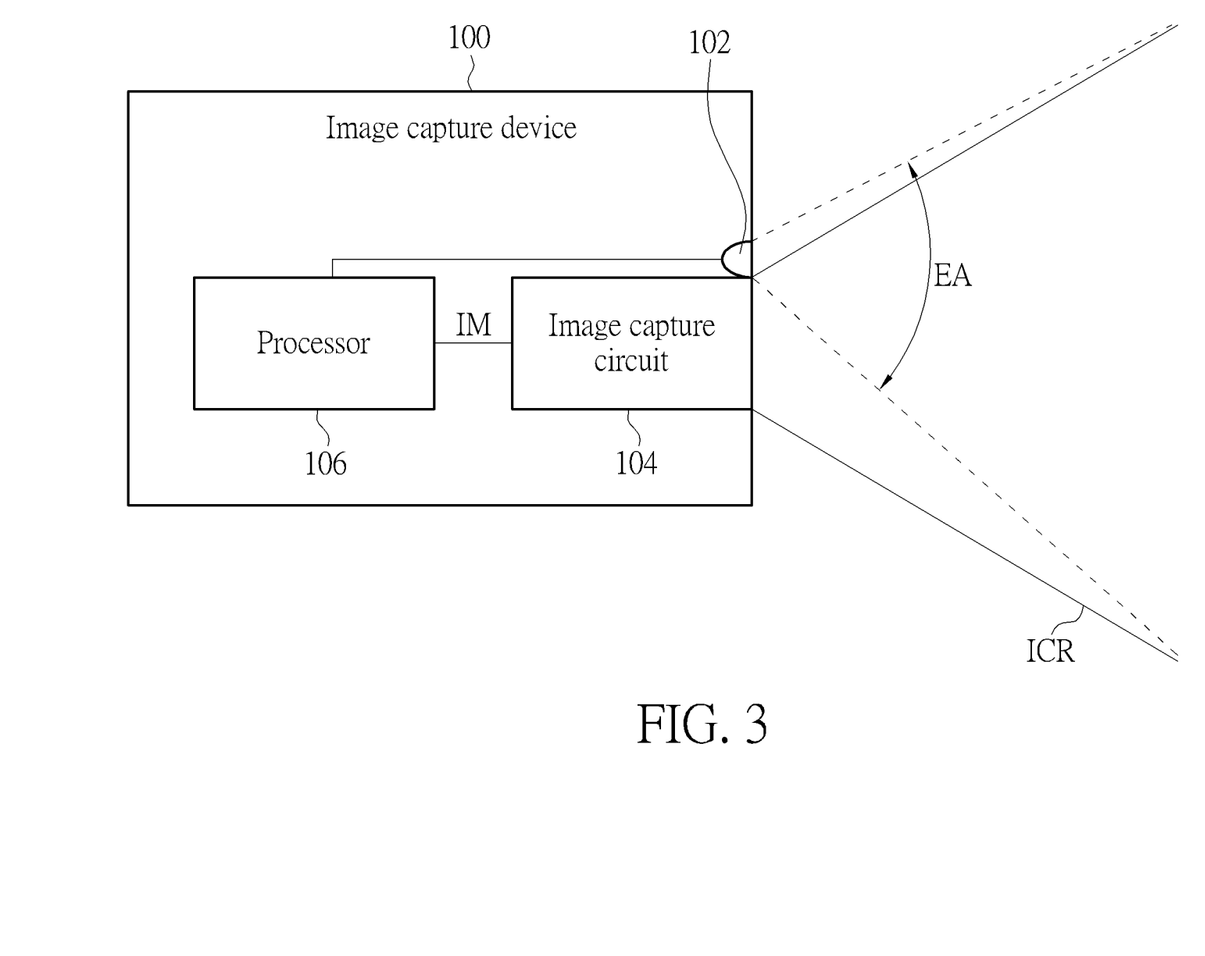
FIG. 3 is a diagram illustrating an image capture range of the image capture circuit being almost equal to an emitting angle of the light source.
Figure 4:
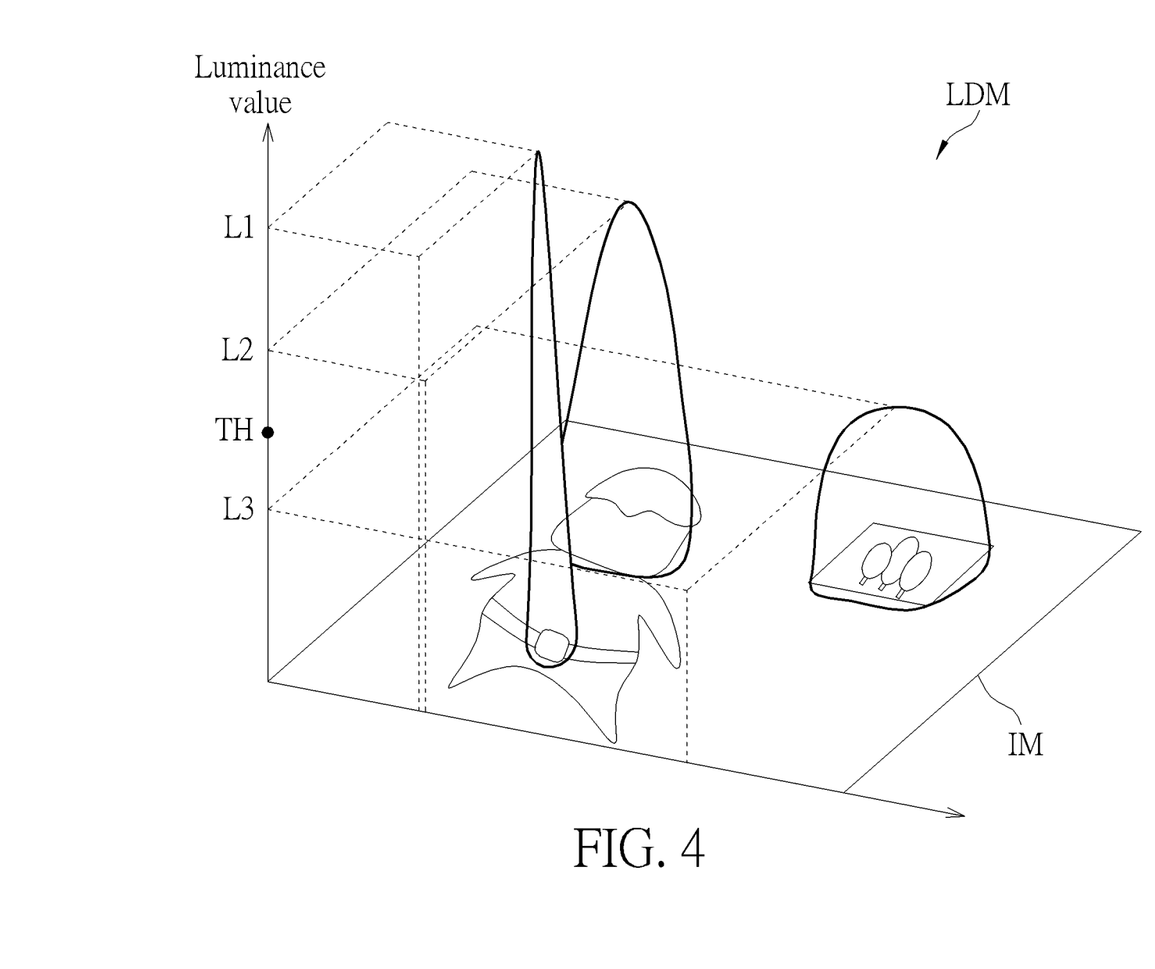
FIG. 4 is a diagram illustrating a luminance distribution map corresponding to the image.
Figure 5:
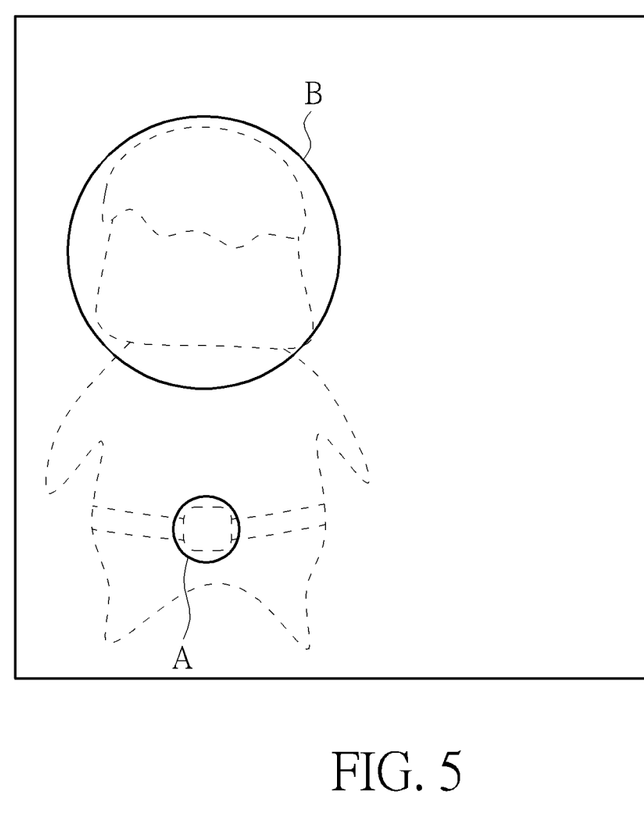
FIG. 5 is a top view corresponding to the luminance distribution map shown in FIG. 4.
Figure 6:
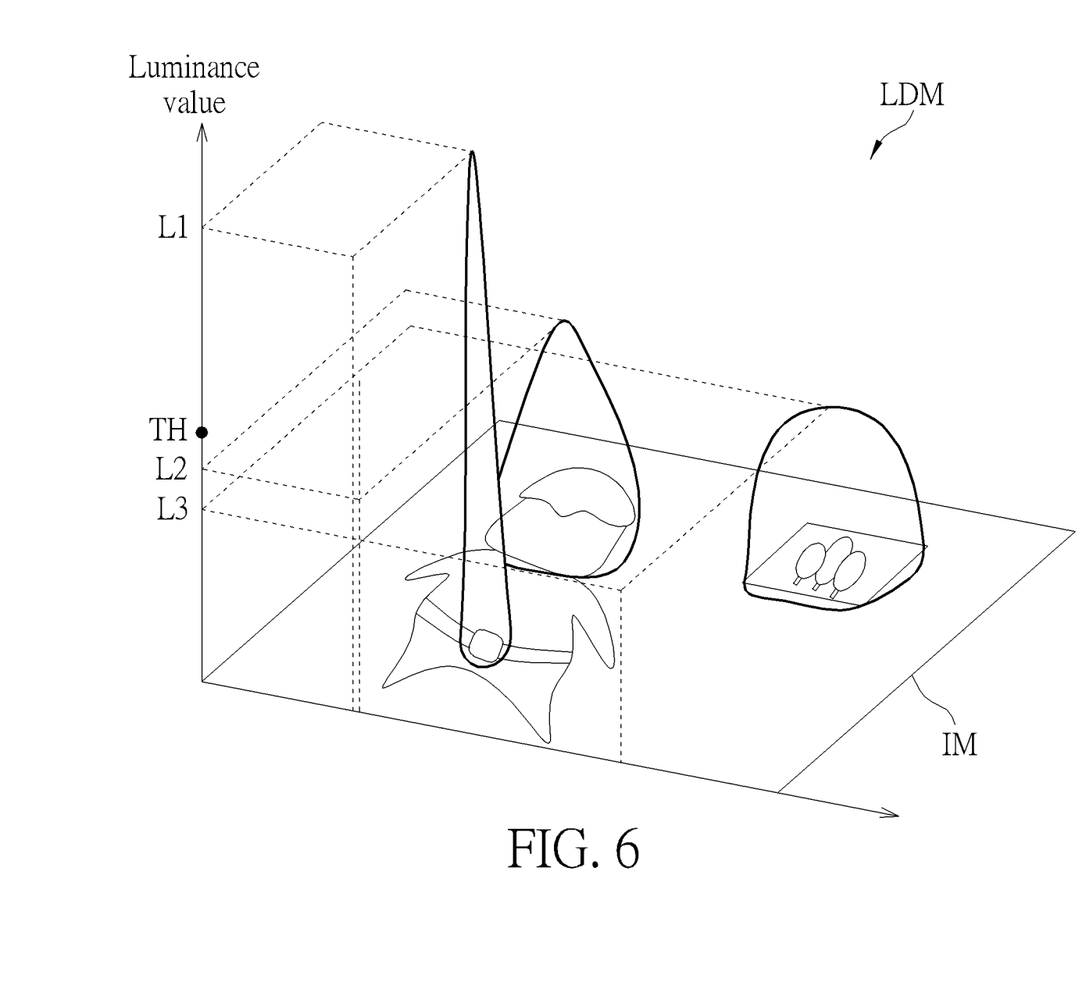
FIG. 6 is a diagram illustrating a luminance value less than the target value.

Please refer to FIG. 1. FIG. 1 is a diagram illustrating an image capture device 100 according to a first embodiment of the present invention. As shown in FIG. 1, the image capture device 100 includes a light source 102, an image capture circuit 104, and a processor 106, wherein the processor 106 is coupled to the image capture circuit 104 and the light source 102, and the image capture device 100 is applied to an interactive audio and video device. The light source 102 is used for generating emitting light, wherein the light source 102 can be a laser light source, a light emitting diode light source, or an infrared ray light source. The image capture circuit 104 is used for capturing an image IM (shown in FIG. 2) corresponding to the emitting light, wherein an image capture range ICR of the image capture circuit 104 is almost equal to an emitting angle EA (shown in FIG. 3) of the light source 102, and the image IM includes a user 108, a mural 110, and a background. After the image capture circuit 104 captures the image IM, the processor 106 can generate a luminance distribution map LDM (shown in FIG. 4) corresponding to the image IM according to the image IM, wherein as shown in FIG. 4, a belt buckle 1082 of the user 108 has a luminance value L1, a face of the user 108 has a luminance value L2, and the mural 110 has a luminance value L3. In addition, the luminance value L1 of the belt buckle 1082 and the luminance value L2 of the face of the user 108 are greater than a target value TH, the luminance value L3 of the mural 110 is less than the target value TH, and the luminance value L1 is greater than the luminance value L2. After the processor 106 generates the luminance distribution map LDM corresponding to the image IM, the processor 106 can optionally adjust intensity of the emitting light of the light source 102 to make an adjusted maximum luminance value be close to the target value TH according to a percentage of the image IM occupied by an area corresponding to the maximum luminance value of at least one luminance value within the luminance distribution map LDM greater than the target value TH, wherein because a purpose of the present invention is used for preventing eyes of the user 108 from being damaged, the target value TH is set according to a reflection coefficient of a human skin of the user 108 corresponding to the emitting light of the light source 102. Therefore, as shown in FIG. 5 (wherein FIG. 5 is a top view corresponding to the luminance distribution map LDM shown in FIG. 4), because the luminance value L1 is greater than the luminance value L2, and the luminance value L1 and the luminance value L2 are greater than the target value TH, the processor 106 can first determine whether a percentage of the image IM occupied by an area A corresponding to the luminance value L1 is less than a predetermined percentage (wherein the predetermined percentage is set according to an area of the face of the user 108, and the area A is approximately equal to an area of the belt buckle 1082 of the user 108). However, in another embodiment of the present invention, the processor 106 utilizes a face recognition method provided by the prior art to recognize face(s) within the image IM. Because the percentage of the image IM occupied by the area A corresponding to the luminance value L1 is less than the predetermined percentage, the processor 106 does not reduce the intensity of the emitting light of the light source 102 to make the luminance value L1 be close to the target value TH. However, after the processor 106 does not reduce the intensity of the emitting light of the light source 102 to make the luminance value L1 be close to the target value TH, then the processor 106 determines whether a percentage of the image IM occupied by an area B corresponding to the luminance value L2 is less than the predetermined percentage. Because the percentage of the image IM occupied by the area B corresponding to the luminance value L2 is greater than the predetermined percentage (wherein the area B is approximately equal to the area of the face of the user 108), the processor 106 can reduce the intensity of the emitting light of the light source 102 to make the adjusted luminance value L2 be close to the target value TH, wherein the processor 106 utilizes a digital dimming method to reduce the intensity of the emitting light of the light source 102 to make the adjusted luminance value L2 be close to the target value TH. For example, the processor 106 reduces a duty cycle of a pulse width modulation (PWM) signal inputted to the light source 102 to make the adjusted luminance value L2 be close to the target value TH. But, in another embodiment of the present invention, the processor 106 utilizes an analog dimming method to reduce the intensity of the emitting light of the light source 102 to make the adjusted luminance value L2 be close to the target value TH. For example, the processor 106 utilizes a programmable variable resistor to reduce a current or a voltage inputted to the light source 102 (or to simultaneously adjust the current and the voltage inputted to the light source 102) to make the adjusted luminance value L2 be close to the target value TH. In addition, in another embodiment of the present invention, when the light source 102 is a programmable dimming light source (that is, the light source 102 is a light source which can be dimmed by partition), the processor 106 can reduce intensity of a part of the emitting light of the light source 102 only corresponding to the luminance value L2 to make the adjusted luminance value L2 be close to the target value TH. In addition, in another embodiment of the present invention, when the light source 102 is a programmable dimming light source, the processor 106 can reduce intensity of a part of the emitting light of the light source 102 only corresponding to each luminance value generated by the light source 102 greater than the target value TH (wherein a percentage of the image IM occupied by an area corresponding to the each luminance value is greater than the predetermined percentage) respectively to make the each adjusted luminance value be close to the target value TH. In addition, because the processor 106 can also process luminance values of clothes and pants of the user 108 included in the image IM according to the above mentioned principles, so further description thereof is omitted for simplicity. In addition, in another embodiment of the present invention, because the luminance value L2 is less than the target value TH (shown in FIG. 6), the processor 106 can increase the intensity of the emitting light of the light source 102 to make the adjusted luminance value L2 be close to the target value TH.

In addition, if three luminance values or more than three luminance values within the luminance distribution map LDM are greater than the target value TH, the processor 106 can also determine how to adjust the intensity of the emitting light of the light source 102 according to the above mentioned principles.

In addition, in another embodiment of the present invention, the processor 106 can optionally adjust the intensity of the emitting light of the light source 102 according to average luminance corresponding to the image IM to make the adjusted average luminance corresponding to the image IM be close to the target value TH. For example, when the average luminance corresponding to the image IM is greater than the target value TH, the processor 106 can reduce the intensity of the emitting light of the light source 102 to make the adjusted average luminance corresponding to the image IM be close to the target value TH; and when the average luminance corresponding to the image IM is less than the target value TH, the processor 106 can increase the intensity of the emitting light of the light source 102 to make the adjusted average luminance corresponding to the image IM be close to the target value TH.

Figure 7:
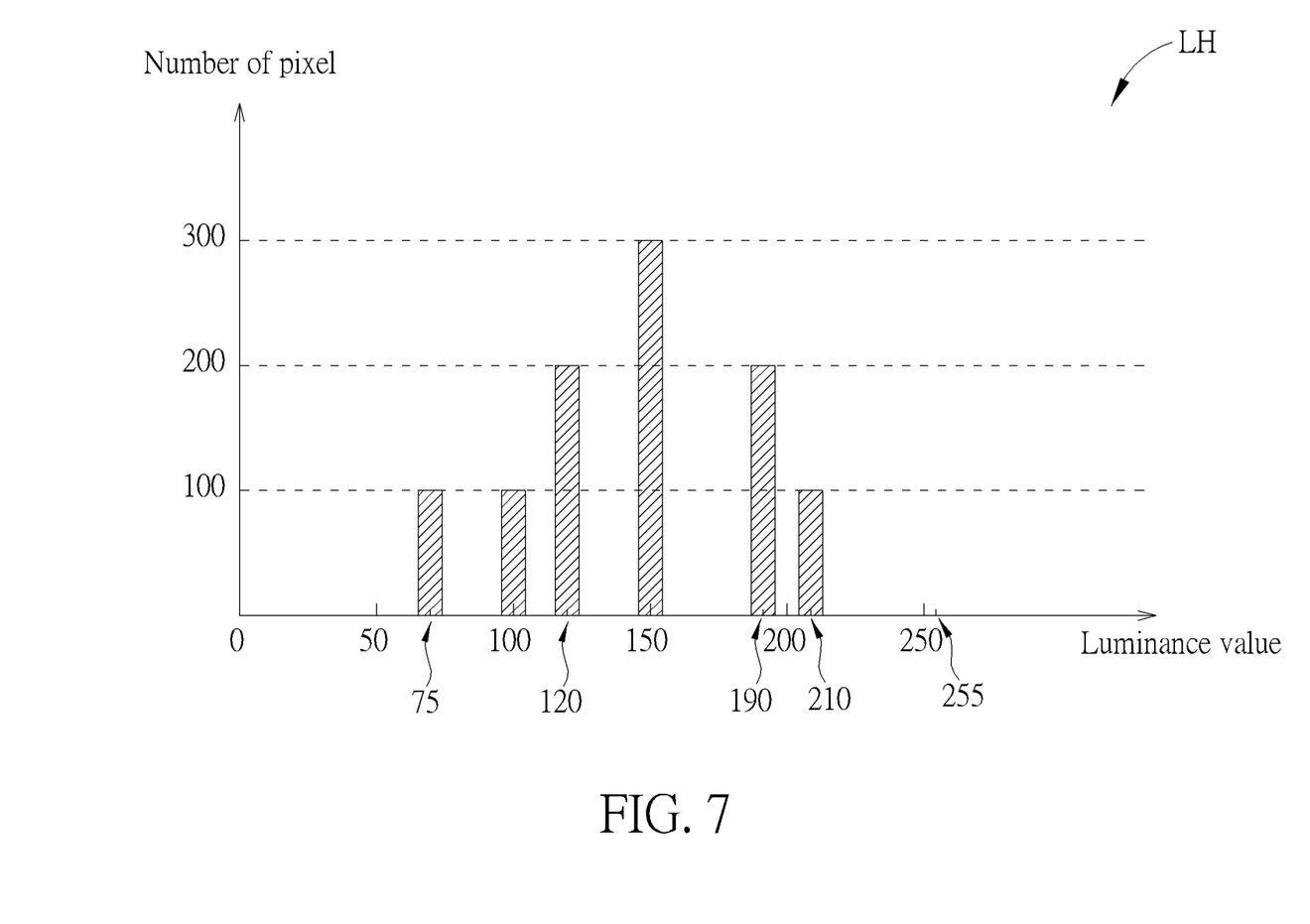
FIG. 7 is a diagram illustrating a luminance histogram corresponding to the image.

In addition, in another embodiment of the present invention, the processor 106 can adjust the intensity of the emitting light of the light source 102 according to a median or a quartile of a luminance histogram corresponding to a plurality of pixels of the image IM to make a new median or a new quartile corresponding to the image IM be close to the target value TH. For example, the processor 106 can utilize a value within 0-255 (corresponding to 8 bits) to represent luminance of each pixel of the image IM to generate a luminance histogram LH (shown in FIG. 7, wherein FIG. 7 is used for describing the present invention, that is, the present invention is not limited to FIG. 7) corresponding to 1000 pixels of the image IM. As shown in FIG. 7, because 100 pixels of the image IM have a luminance value 75, 100 pixels of the image IM have a luminance value 100, 200 pixels of the image IM have a luminance value 120, 300 pixels of the image IM have a luminance value 150, 200 pixels of the image IM have a luminance value 190, and 100 pixels of the image IM have a luminance value 210, a median of the luminance histogram LH corresponding to the 1000 pixels of the image IM is equal to 150. Thus, the processor 106 can increase (when the median (150) is less than the target value TH) or decrease (when the median (150) is greater than the target value TH) the intensity of the emitting light of the light source 102 according to the median (150) of the luminance histogram LH corresponding to the 1000 pixels of the image IM and the target value TH to make a new median of an adjusted luminance histogram corresponding to the 1000 pixels of the image IM be close to the target value TH. In addition, the present invention is not limited to utilizing a value within 0-255 to represent luminance of each pixel of the image IM. That is to say, the present invention can also utilize a value corresponding to other bits (e.g. 16 bits) to represent luminance of each pixel of the image IM. In addition, any configuration in which the processor 106 adjusts the intensity of the emitting light of the light source 102 according to the luminance corresponding to the image IM and the target value TH falls within the scope of the present invention.

Figure 8:
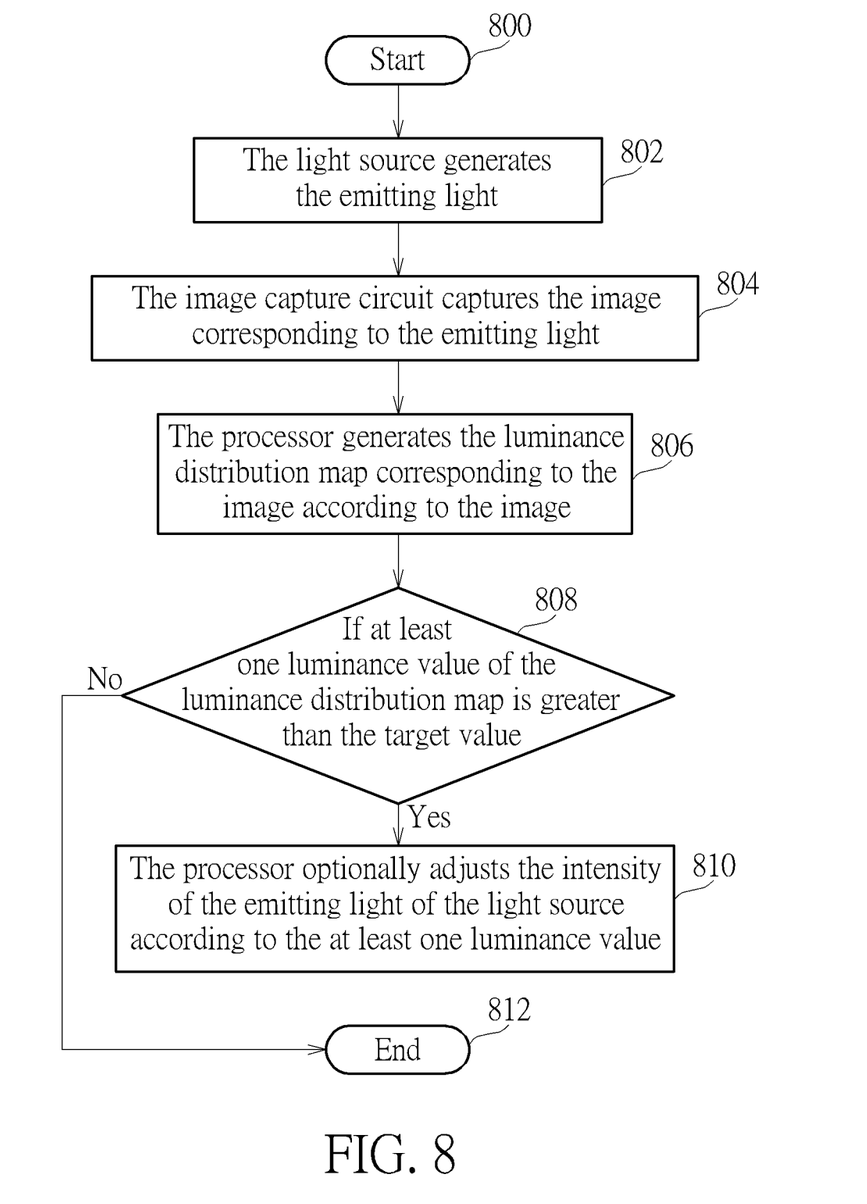
FIG. 8 is a flowchart illustrating an operation method of an image capture device according to a second embodiment of the present invention.

Please refer to FIGS. 1-6, 8. FIG. 8 is a flowchart illustrating an operation method of an image capture device according to a second embodiment of the present invention. The operation method in FIG. 8 is illustrated using the image capture device 100 in FIG. 1. Detailed steps are as follows:

Step 800: Start.

Step 802: The light source 102 generates the emitting light.

Step 804: The image capture circuit 104 captures the image IM corresponding to the emitting light.

Step 806: The processor 106 generates the luminance distribution map LDM corresponding to the image IM according to the image IM.

Step 808: If at least one luminance value of the luminance distribution map LDM is greater than the target value TH; if yes, go to Step 810; if no, go to Step 812.

Step 810: The processor 106 optionally adjusts the intensity of the emitting light of the light source 102 according to the at least one luminance value.

Step 812: End.

In Step 806, after the image capture circuit 104 captures the image IM, the processor 106 can generate the luminance distribution map LDM (shown in FIG. 4) corresponding to the image IM according to the image IM, wherein as shown in FIG. 4, the luminance value L1 of the belt buckle 1082 and the luminance value L2 of the face of the user 108 are greater than the target value TH, the luminance value L3 of the mural 110 is less than the target value TH, and the luminance value L1 is greater than the luminance value L2. In addition, because the purpose of the present invention is used for preventing the eyes of the user 108 from being damaged, the target value TH is set according to the reflection coefficient of the human skin of the user 108 corresponding to the emitting light of the light source 102. Therefore, in Step 810, as shown in FIG. 5, because the luminance value L1 is greater than the luminance value L2, and the luminance value L1 and the luminance value L2 are greater than the target value TH, the processor 106 can first determine whether the percentage of the image IM occupied by the area A corresponding to the luminance value L1 is less than the predetermined percentage. However, in another embodiment of the present invention, the processor 106 utilizes the face recognition method provided by the prior art to recognize face (s) within the image IM. Because the percentage of the image IM occupied by the area A corresponding to the luminance value L1 is less than the predetermined percentage, the processor 106 does not reduce the intensity of the emitting light of the light source 102 to make the luminance value L1 be close to the target value TH. However, after the processor 106 does not reduce the intensity of the emitting light of the light source 102 to make the luminance value L1 be close to the target value TH, then the processor 106 determines whether the percentage of the image IM occupied by the area B corresponding to the luminance value L2 is less than the predetermined percentage. Because the percentage of the image IM occupied by the area B corresponding to the luminance value L2 is greater than the predetermined percentage, the processor 106 can reduce the intensity of the emitting light of the light source 102 to make the adjusted luminance value L2 be close to the target value TH. In addition, the processor 106 can also process the luminance values of the clothes and the pants of the user 108 included in the image IM according to the above mentioned principles, so further description thereof is omitted for simplicity. In addition, in another embodiment of the present invention, because the luminance value L2 is less than the target value TH (shown in FIG. 6), the processor 106 can increase the intensity of the emitting light of the light source 102 to make the adjusted luminance value L2 be close to the target value TH.

In addition, if three luminance values or more than three luminance values within the luminance distribution map LDM are greater than the target value TH, the processor 106 can also determine how to adjust the intensity of the emitting light of the light source 102 according to the above mentioned principles.

Figure 9:
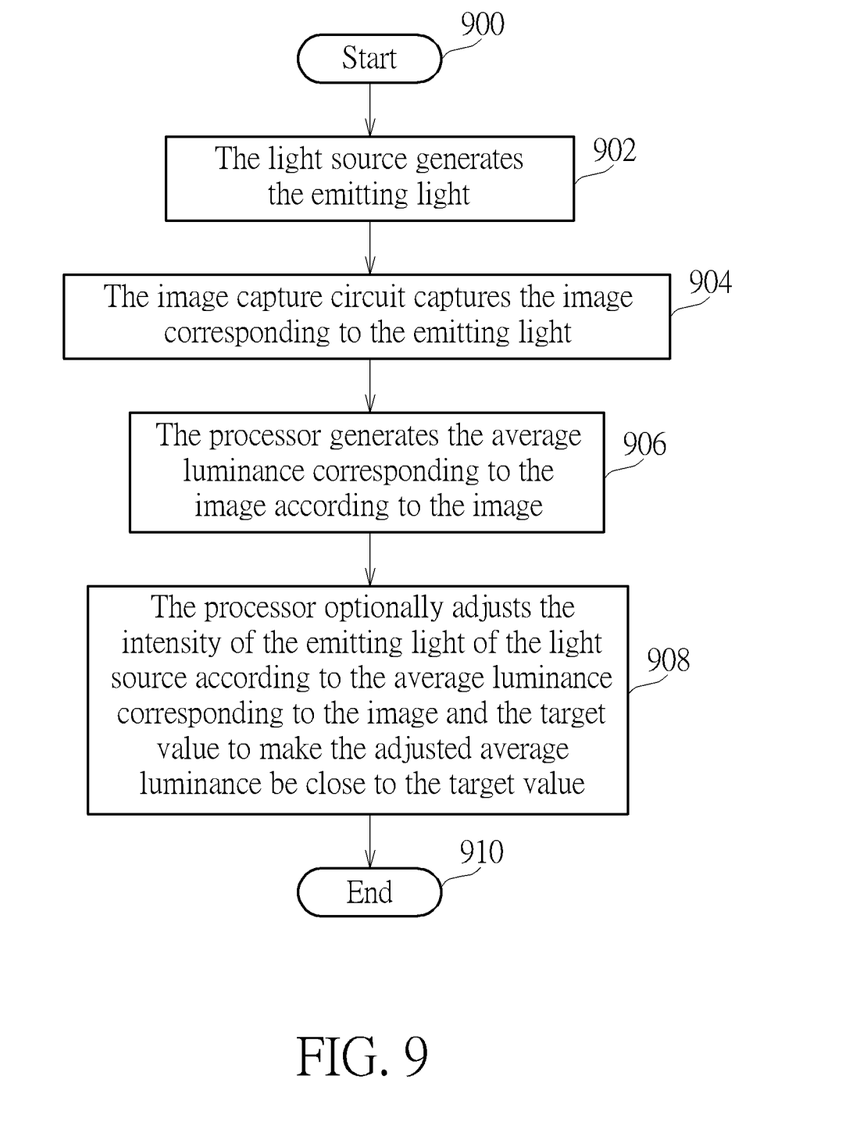
FIG. 9 is a flowchart illustrating an operation method of an image capture device according to a third embodiment of the present invention.

Please refer to FIGS. 1, 9. FIG. 9 is a flowchart illustrating an operation method of an image capture device according to a third embodiment of the present invention. The operation method in FIG. 9 is illustrated using the image capture device 100 in FIG. 1. Detailed steps are as follows:

Step 900: Start.

Step 902: The light source 102 generates the emitting light.

Step 904: The image capture circuit 104 captures the image IM corresponding to the emitting light.

Step 906: The processor 106 generates the average luminance corresponding to the image IM according to the image IM.

Step 908: The processor 106 optionally adjusts the intensity of the emitting light of the light source 102 according to the average luminance corresponding to the image IM and the target value TH to make the adjusted average luminance be close to the target value TH.

Step 910: End.

Differences between the embodiment in FIG. 9 and the embodiment in FIG. 8 are that in Step 906 and Step 908, the processor 106 first generates the average luminance corresponding to the image IM according to the image IM; and when the average luminance corresponding to the image IM is greater than the target value TH, the processor 106 reduces the intensity of the emitting light of the light source 102 to make the adjusted average luminance corresponding to the image IM be close to the target value TH, and when the average luminance corresponding to the image IM is less than the target value TH, the processor 106 increases the intensity of the emitting light of the light source 102 to make the adjusted average luminance corresponding to the image IM be close to the target value TH.

Figure 10:
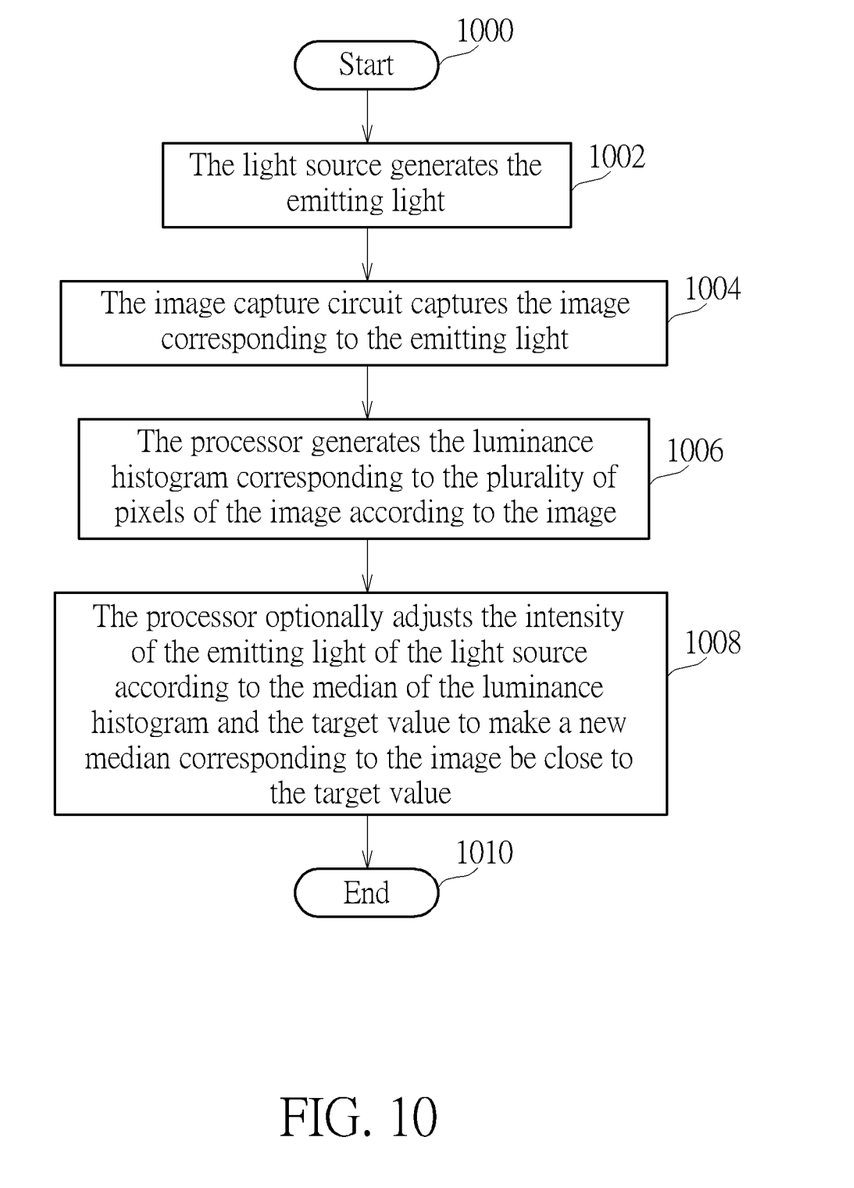
FIG. 10 is a flowchart illustrating an operation method of an image capture device according to a fourth embodiment of the present invention.

Please refer to FIGS. 1, 7, 10. FIG. 10 is a flowchart illustrating an operation method of an image capture device according to a fourth embodiment of the present invention. The operation method in FIG. 10 is illustrated using the image capture device 100 in FIG. 1. Detailed steps are as follows:

Step 1000: Start.

Step 1002: The light source 102 generates the emitting light.

Step 1004: The image capture circuit 104 captures the image IM corresponding to the emitting light.

Step 1006: The processor 106 generates the luminance histogram LH corresponding to the plurality of pixels of the image IM according to the image IM.

Step 1008: The processor 106 optionally adjusts the intensity of the emitting light of the light source 102 according to the median of the luminance histogram LH and the target value TH to make a new median corresponding to the image IM be close to the target value TH.

Step 1010: End.

Differences between the embodiment in FIG. 10 and the embodiment in FIG. 8 are that in Step 1006, the processor 106 can first utilize a value within 0-255 (corresponding to 8 bits) to represent luminance of each pixel of the image IM to generate the luminance histogram LH (shown in FIG. 7) corresponding to the 1000pixels of the image IM; and in Step 1008, as shown in FIG. 7, because 100 pixels of the image IM have the luminance value 75, 100 pixels of the image IM have the luminance value 100, 200 pixels of the image IM have the luminance value 120, 300 pixels of the image IM have the luminance value 150, 200 pixels of the image IM have the luminance value 190, and 100 pixels of the image IM have the luminance value 210, the median of the luminance histogram LH corresponding to the 1000 pixels of the image IM is equal to 150. Thus, the processor 106 can increase (when the median (150) is less than the target value TH) or decrease (when the median (150) is greater than the target value TH) the intensity of the emitting light of the light source 102 according to the median (150) of the luminance histogram LH corresponding to the 1000 pixels of the image IM and the target value TH to make a new median of an adjusted luminance histogram corresponding to the 1000 pixels of the image IM be close to the target value TH. In addition, the present invention is not limited to utilizing a value within 0-255 to represent luminance of each pixel of the image IM. That is to say, the present invention can also utilize a value corresponding to other bits (e.g. 16 bits) to represent luminance of each pixel of the image IM. In addition, in another embodiment of the present invention, the processor 106 can determine how to adjust the intensity of the emitting light of the light source 102 according to a quartile of luminance histogram LH and the target value TH to make a new quartile corresponding to the image IM be close to the target value TH.

In addition, any configuration in which the processor 106 adjusts the intensity of the emitting light of the light source 102 according to the luminance corresponding to the image IM and the target value TH falls within the scope of the present invention.

To sum up, the image capture device and the operation method thereof utilize the processor to optionally adjust the intensity of the emitting light of the light source according to different luminance values of an image corresponding to the emitting light of the light source and the target value. Therefore, compared to the prior art, the present invention can ensure that the light source of the image capture device does not damage the eyes of the user within a maximum operation distance of the emitting light generated by the light source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capture device, comprising:
   a light source generating emitting light;
   an image capture circuit capturing a captured image corresponding to a user, wherein an image capture range of the image capture circuit is substantially equal to an emitting angle of the light source; and
   a processor coupled to the image capture circuit and the light source;
   wherein when a corresponding value of a preselected physical factor of the captured image is greater than a preset target value, the processor controls the light source to reduce intensity of the emitting light such that the corresponding value of the preselected physical factor of a new captured image from the image capture circuit is close to the preset target value, wherein the preset target value is set according to a reflection coefficient of a human skin corresponding to the emitting light.

2. The image capture device of claim 1, wherein the processor generates a luminance histogram according to the captured image.

3. The image capture device of claim 1, wherein the processor optionally adjusts the intensity of the emitting light of the light source in order to ensure that the light source does not damage eyes of the user within a maximum operation distance of the emitting light.

4. An image capture device, comprising:
   a light source generating emitting light;
   an image capture circuit capturing a captured image corresponding to a user, wherein an image capture range of the image capture circuit is substantially equal to an emitting angle of the light source; and
   a processor coupled to the image capture circuit and the light source;
   wherein when a corresponding value of a preselected physical factor of the captured image is greater than a preset target value, the processor controls the light source to reduce intensity of the emitting light such that the corresponding value of the preselected physical factor of a new captured image from the image capture circuit is close to the preset target value, wherein the preset target value is set according to intensity of a reflection light corresponding to the emitting light and intensity of the emitting light-to prevent eyes of the user from hurt.

* * * * *